Feb. 24, 1942.  C. H. LAVALIER  2,274,074
SAFETY BLOCK ATTACHMENT
Filed March 26, 1941

INVENTOR.
BY Clair H. Lavalier.
Geo. Stevens.

Patented Feb. 24, 1942

2,274,074

UNITED STATES PATENT OFFICE 2,274,074

SAFETY BLOCK ATTACHMENT

Clair H. Lavalier, Keewatin, Minn.

Application March 26, 1941, Serial No. 385,267

2 Claims. (Cl. 298—17)

This invention relates to safety blocks or scotch for dump vehicles, or the like, the principal object being to provide simple and conveniently operable means to insure safety in the ordinary manipulation of such a vehicle.

It is well known that when the dump element of a vehicle of this character is raised there is danger of its unexpectedly falling, resulting in accident, as for example, during lubrication or repair, or when the vehicle is used for the transportation of coal, sand, or the like, requiring considerable manipulation of the load which ofttimes requires the operator to board the dumping element in shoveling the load and otherwise assisting in the dumping operation, and to avoid accidents under such circumstances is the principal object of the invention.

Other objects and advantages of the invention will appear in the following description thereof.

Referring now to the accompanying drawing, forming part of this application, and wherein like reference characters indicate like parts:

Figure 1:
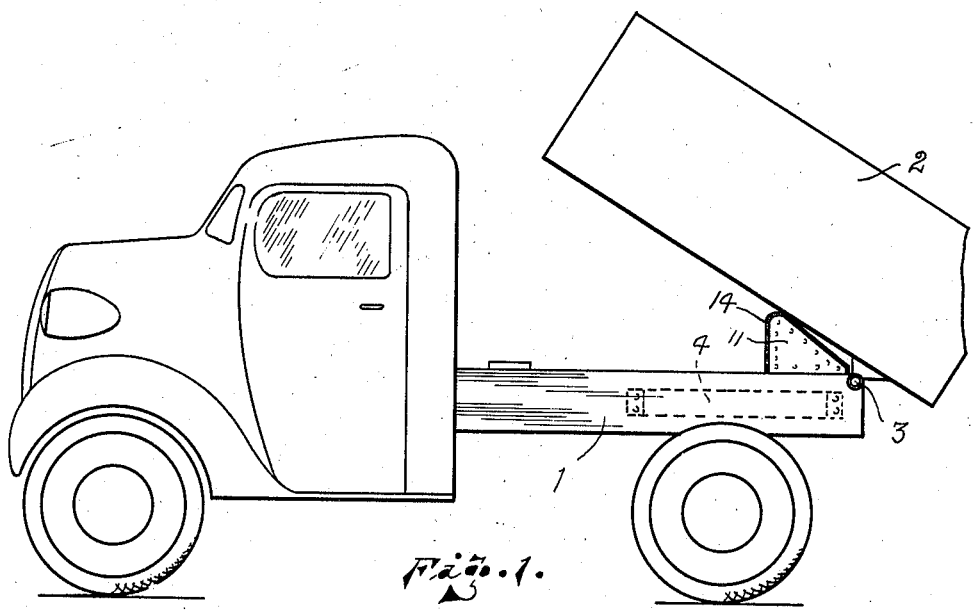
Figure 1 is a side elevation of a truck having a pivotally supported dumping element mounted thereupon.
Figures 2, 3:
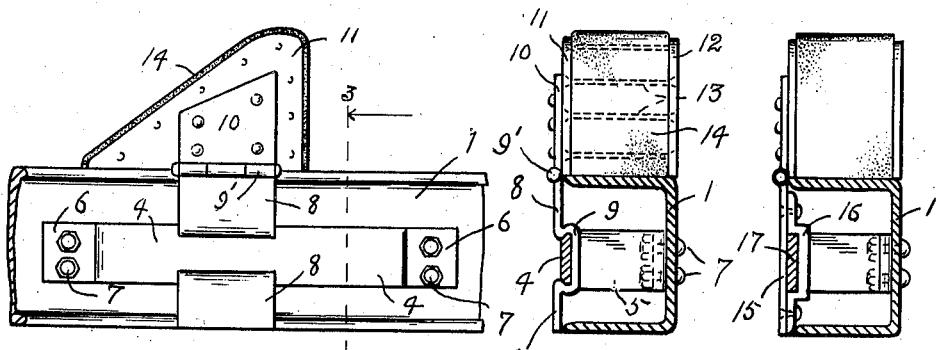
Figure 2 is an enlarged elevation of the improved scotch viewed from the interior of the chassis of the vehicle.
Figure 3 is a sectional view of one side of the chassis, taken on the line 3—3, Figure 2.

I represents one side member of the chassis of the vehicle, which, in this instance, is illustrated as being of channel iron construction as is common, and 2 represents the dump box or element pivotally mounted as at 3 transverse the tail of the chassis.

The preferred type of scotch installation contemplates the fixing of an elongated metal bar 4 within at least one side of the chassis frame 1, it being bent at right angles at its ends as at 5 a distance sufficient to cause the outwardly spaced body portion 4 to occur in the same plane with the innermost termini of the flanges of the channel, and thence bent at right angles again outwardly to form convenient and adequate clamps 6 through which the holding bolts 7 are installed as clearly illustrated.

The scotch supporting member comprises the flat metal base portion 8 which is shown in one instance as being provided with a dovetail-groove like portion indicated at 9, centrally of its ends, and which groove is designed to be of the shape of the body portion 4 of the supporting bar just described, while the upper end of the base member 8 is shaped to form one portion of the hinge member illustrated at 9'. The other portion of the hinge member extends in a like manner from the hinge, forming the member 10, which is securely attached as by riveting or spot welding to one metal wall 11 of the scotch, the opposite wall of same being indicated at 12, and these latter walls are united as by suitable rivets or bolts 13. The body portion 14 of the scotch, in this instance, is shown as being of solid rubber, or other resilient substance of the proper yieldability for the purpose, but may be of more solid material and faced with rubber or its equivalent.

By such construction it is apparent that the scotch being thus mounted may readily be slid as desired at least the length of the supporting bar 4 and also pivotally adjustable upwardly on top of the chassis frame as illustrated in the drawing, or foldable inwardly and downwardly against the base portion 8 of its support, and which results in a very convenient and simple device, adjustable to various positions in a most convenient manner for positive support of the dump member 2 of the vehicle.

Figure 5:
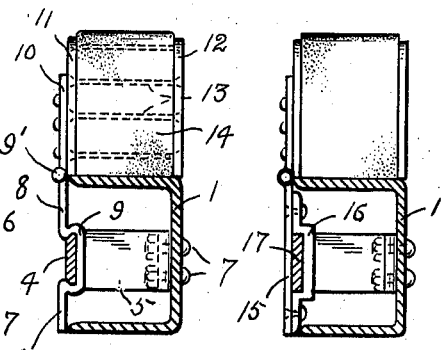
Figure 5 is a view similar to Figure 3 of a modified form of slidable connection of the scotch.
Figure 4:
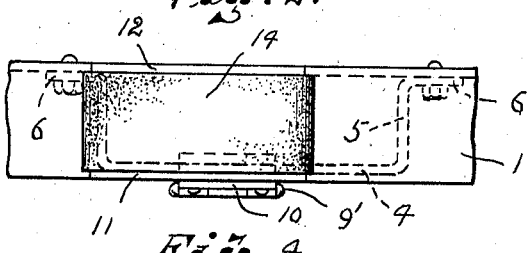
Figure 4 is a top plan view of Figure 2.

In Figure 5 I have illustrated a slightly modified form of union of the base member 15 of the hinge for the scotch in that in this instance the base member is of a flat piece of metal carrying the holding clip 16 surrounding the bar 17 which corresponds to the bar 4 in the previously described modification. This construction may be considerably preferred, in some instances, to the former.

It will be noted in both modifications described the lower portion of the base members, either 8 or 15, is designed to engage, or at least meet, the lower flange of the chassis frame to further supportingly guide the scotch when folded inwardly and out of use.

Having thus described my invention, what I claim and desire to secure by Letters Patent, is:

1. A scotch for dump vehicles or the like having a chassis frame upon which the dump member normally rides, comprising in combination an elongated supporting member fixed to the inner face of one of the sides of the chassis frame, a comparatively soft resiliently faced scotch slidably mountable upon the upper face of said chassis frame member, and a hinged bracket slidably carried upon said supporting member for pivotal support of said scotch.

2. In a vehicle having a pivotally mounted dump member thereupon, a side chassis frame member, a bar carried by and slightly spaced from said frame member, a safety scotch slidable upon said frame member for selective positioning intermediate of said dump member and said chassis, and a hinge bracket one portion of which slidably engages said frame member and the other portion of which pivotally supports the scotch for the purpose described.

CLAIR H. LAVALIER.